(12) United States Patent
Mortensen et al.

(10) Patent No.: US 11,932,538 B2
(45) Date of Patent: Mar. 19, 2024

(54) PROCESS AND SYSTEM FOR REFORMING A HYDROCARBON GAS

(71) Applicant: HALDOR TOPSØE A/S, Kgs. Lyngby (DK)

(72) Inventors: Peter Mølgaard Mortensen, Roskilde (DK); Martin Østberg, Tune (DK)

(73) Assignee: Haldor Topsøe A/S, Kgs. Lyngby (DK)

( * ) Notice: Subject to any disclaimer, the term of this patent is extended or adjusted under 35 U.S.C. 154(b) by 203 days.

(21) Appl. No.: 16/766,415

(22) PCT Filed: Nov. 15, 2018

(86) PCT No.: PCT/EP2018/081404
§ 371 (c)(1),
(2) Date: May 22, 2020

(87) PCT Pub. No.: WO2019/110265
PCT Pub. Date: Jun. 13, 2019

(65) Prior Publication Data
US 2020/0377365 A1    Dec. 3, 2020

(30) Foreign Application Priority Data

Dec. 8, 2017 (DK) .......................... PA 2017 00697

(51) Int. Cl.
*C01B 3/38* (2006.01)
*B01J 19/00* (2006.01)
(Continued)

(52) U.S. Cl.
CPC ........... *C01B 3/384* (2013.01); *B01J 19/0013* (2013.01); *B01J 19/245* (2013.01); *C01B 3/382* (2013.01);
(Continued)

(58) Field of Classification Search
CPC ............ C01B 3/384; C01B 2203/0233; C01B 2203/0244; C01B 2203/085;
(Continued)

(56) References Cited

U.S. PATENT DOCUMENTS 4,985,230 A   1/1991  Baden et al.
5,102,645 A   4/1992  Fisher et al.
(Continued)

FOREIGN PATENT DOCUMENTS

AU     2007242933 A1    1/2008
CA        2396402 A1 *  1/2004   ............ B01J 19/087
(Continued)

OTHER PUBLICATIONS

Danish Search Report dated May 15, 2018, issued by the Danish Patent and Trademark Office in the corresponding Finnish Patent Application No. PA 2017 00697. (8 pages).
(Continued)

*Primary Examiner* — Matthew J Merkling
(74) *Attorney, Agent, or Firm* — Boone IP Law

(57) ABSTRACT

The invention relates to a process for reforming a hydrocarbon feed stream comprising a hydrocarbon gas and steam, said process comprising the steps of: a) in a synthesis gas generation reactor carrying out a reforming reaction of the hydrocarbon feed stream over a first catalyst, thereby forming a first synthesis gas; b) providing a heated $CO_2$ rich stream to a post converter comprising a second catalyst; and c) in said post converter carrying out a methanation, steam reforming and reverse water gas shift reactions of the first synthesis gas and the heated $CO_2$ rich stream to produce a product synthesis gas, wherein said second catalyst is heated electrically by means of an electrical power source. The invention moreover relates to a system arranged to carry out the process of the invention.

20 Claims, 1 Drawing Sheet

(51) Int. Cl.
*B01J 19/24* (2006.01)
*C10K 3/02* (2006.01)

(52) U.S. Cl.
CPC ....... *C10K 3/026* (2013.01); *B01J 2219/0004* (2013.01); *B01J 2219/00135* (2013.01); *C01B 2203/0233* (2013.01); *C01B 2203/0244* (2013.01); *C01B 2203/085* (2013.01); *C01B 2203/1241* (2013.01)

(58) Field of Classification Search
CPC ........... C01B 2203/1241; B01J 19/0013; B01J 19/245; B01J 2219/0004; B01J 2219/00135
See application file for complete search history.

(56) References Cited

U.S. PATENT DOCUMENTS

| | | | |
|---|---|---|---|
| 5,536,699 | A | 7/1996 | Ghelfi et al. |
| 5,958,273 | A | 9/1999 | Koch et al. |
| 6,527,980 | B1 | 3/2003 | Roden et al. |
| 9,834,440 | B2 | 12/2017 | Kern et al. |
| 2002/0081253 | A1* | 6/2002 | Abe ............... H01M 8/0631 502/100 |
| 2002/0119084 | A1 | 8/2002 | Boneberg et al. |
| 2003/0014974 | A1 | 1/2003 | Rojey et al. |
| 2003/0068269 | A1* | 4/2003 | Matzakos ............. B01J 8/0214 423/652 |
| 2003/0162846 | A1 | 8/2003 | Wang et al. |
| 2005/0054737 | A1 | 3/2005 | Lee-Tuffnell et al. |
| 2010/0176346 | A1* | 7/2010 | Musich .................. B01J 8/025 252/373 |
| 2012/0025140 | A1 | 2/2012 | Tetzlaff |
| 2013/0334465 | A1 | 12/2013 | Zhao et al. |
| 2013/0345326 | A1 | 12/2013 | Bashir et al. |
| 2015/0129805 | A1 | 5/2015 | Karpenko et al. |
| 2016/0023201 | A1 | 1/2016 | Chaudret et al. |
| 2016/0318824 | A1 | 11/2016 | Steynberg et al. |
| 2017/0015549 | A1 | 1/2017 | Mammadov et al. |
| 2017/0106360 | A1 | 4/2017 | Meriam |
| 2020/0317514 | A1 | 10/2020 | Mortensen et al. |
| 2020/0354216 | A1 | 11/2020 | Mortensen |
| 2021/0113983 | A1 | 4/2021 | Mortensen et al. |
| 2021/0171344 | A1 | 6/2021 | Mortensen et al. |
| 2021/0238035 | A1 | 8/2021 | Mortensen et al. |
| 2022/0119255 | A1 | 4/2022 | Mortensen |
| 2022/0162067 | A1 | 5/2022 | Mortensen et al. |

FOREIGN PATENT DOCUMENTS

| | | | |
|---|---|---|---|
| CA | 2866987 | A1 | 9/2013 |
| CA | 2979782 | A1 | 9/2016 |
| EP | 0208929 | A1 | 1/1987 |
| EP | 0291857 | A2 * | 11/1988 |
| EP | 0396650 | A1 | 11/1990 |
| EP | 0433223 | A1 | 6/1991 |
| EP | 0601956 | A2 | 6/1994 |
| GB | 2210286 | A | 6/1989 |
| JP | 2015509905 | A | 4/2015 |
| JP | 2015521578 | A | 7/2015 |
| WO | 03070629 | A1 | 8/2003 |
| WO | 2013135667 | A1 | 9/2013 |
| WO | 2013135699 | A1 | 9/2013 |
| WO | 2013190500 | A2 | 12/2013 |
| WO | 2014180888 | A1 | 11/2014 |
| WO | WO-2015011503 | A1 * | 1/2015 ............... C07C 1/12 |
| WO | 2015103592 | A1 | 7/2015 |
| WO | 2015153610 | A1 | 10/2015 |
| WO | 2017186608 | A1 | 11/2017 |
| WO | 2017211885 | A1 | 12/2017 |

OTHER PUBLICATIONS

International Search Report (PCT/ISA/210) dated Jan. 3, 2019, by the European Patent Office as the International Searching Authority for International Application No. PCT/EP2018/081404.
Written Opinion (PCT/ISA/237) dated Jan. 3, 2019, by the European Patent Office as the International Searching Authority for International Application No. PCT/EP2018/081404.
Aasberg-Petersen, K. et al., "Synthesis gas production for FT synthesis", Chapter 4, Studies in Surface Science and Catalysis, vol. 152, pp. 258-352, 2004.
Mortensen, P. M. et al.: "Direct Hysteresis Heating of Catalytically Active Ni—Co Nanoparticles as Steam Reforming Catalyst" Industrial & Engineering Chemistry Research, vol. 56, No. 47, Nov. 2017. See CAplus abstract No. 2017:1752250.
Mortensen, P. M. et al., "Industrial scale experience on steam reforming of CO2-rich gas", Elsevier, Applied Catalysis A: General 495, pp. 141-151, 2015.
Communication pursuant to Article 94(3) EPC dated Jun. 28, 2022, issued in the corresponding European Patent Application No. 18803667.7, 4 pages.
Danish Search Report dated Jun. 8, 2018, issued in the Danish Patent Application No. PA 2017 00699, 10 pages.
International Search Report and Written Opinion received in the PCT Application No. PCT/EP2018/081407, dated Jan. 3, 2019, 15 pages.
Danish Search Report dated Jun. 8, 2018, issued in the Danish Patent Application No. PA 2017 00700, 10 pages.
Notice of Reasons for Refusal dated Jun. 29, 2022, issued in the corresponding Japanese Patent Application No. 2020-530989, 8 pages including 4 pages of English Translation.
International Search Report received for PCT Application No. PCT/EP2018/081409, dated Jan. 3, 2019, 6 pages.
Written Opinion (PCT/ISA/237) received for PCT Application No. PCT/EP2018/081409, dated Jan. 3, 2019, 6 pages.
Office Action (Notice of Reasons for Refusal) dated Mar. 22, 2023, by the Japanese Patent Office in corresponding Japanese Patent Application No. 2020-530986, and an English Translation of the Office Action. (6 pages).

* cited by examiner

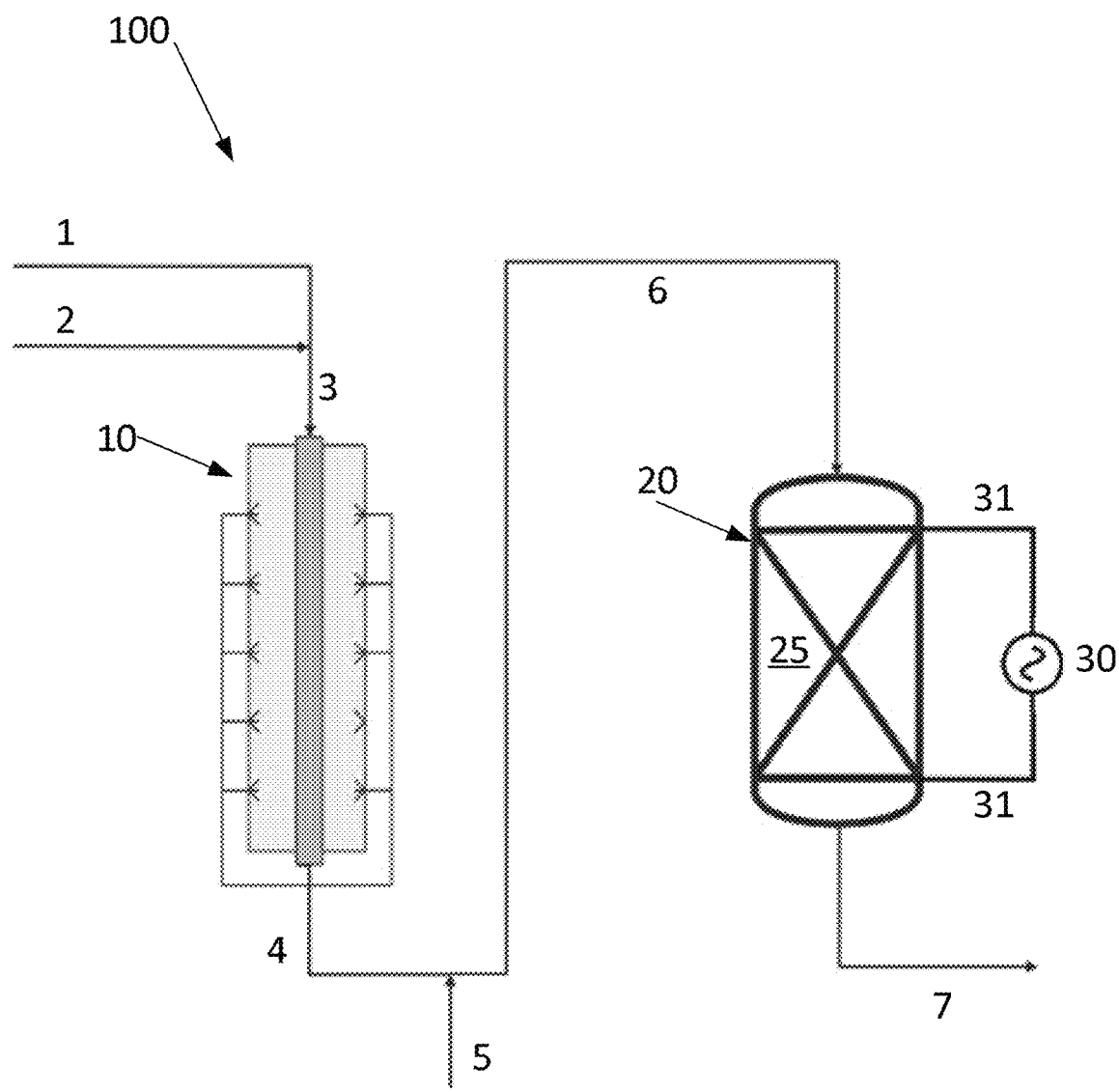

PROCESS AND SYSTEM FOR REFORMING A HYDROCARBON GAS

FIELD OF THE INVENTION

Embodiments of the invention generally relate to process and a system for reforming of a feed stream comprising a hydrocarbon gas and steam. In particular, the invention relates to a reforming process and system aimed at producing a synthesis gas with a relatively low $H_2/CO$ ratio.

BACKGROUND

Catalytic synthesis gas production by steam reforming of a hydrocarbon feed stream has been known for decades. The endothermic steam reforming reaction is typically carried out in a steam reformer (SMR). A steam reformer or steam methane reformer has a number of catalyst filled tubes placed in a furnace or fired heater to provide the heat for the endothermic reaction. The tubes are normally 10-14 meters in length and 7-15 cm in inner diameter. The heat for the endothermic reaction is supplied by combustion of fuels in burners in the furnace. The synthesis gas exit temperature from the steam reformer depends on the application of the synthesis gas but will normally be in the range from 650° C.-980° C.

It is also known that carbon formation on the catalyst used in catalytic synthesis gas production by steam reforming is a challenge, especially for production of synthesis gasses with a relatively low $H_2/CO$ ratio. Therefore, catalysts resistant to carbon formation are required for such synthesis gasses. Such carbon resistant catalysts are e.g. noble metal catalysts, partly passivated nickel catalysts and promoted nickel catalysts. Moreover, industrial scale reforming of $CO_2$ rich gas typically requires a co-feed of water to decrease the severity of the gas to avoid carbon formation. From a thermodynamic viewpoint, it is advantageous to have a high concentration of $CO_2$ and a low concentration of steam in the feed to promote the production of synthesis gas with a low $H_2/CO$ ratio. However, operation at such conditions may not be feasible due to the possibility of carbon formation on the catalyst.

Alternative production of a synthesis gas with a low $H_2/CO$ ratio by steam reforming is a sulfur passivated reforming (SPARG) process which may be used for producing synthesis gas with a relatively low $H_2/CO$ ratio. This process requires desulfurization of the produced synthesis gas to produce a sulphur free synthesis gas.

More details of various processes for producing synthesis gas with low $H_2/CO$-ratio can be found in "Industrial scale experience on steam reforming of $CO_2$-rich gas", P. M. Mortensen & I. Dybkjaer, Applied Catalysis A: General, 495 (2015), 141-151.

Processes based on Autothermal Reforming (ATR) are an alternative route to production of synthesis gas, especially when a low ratio of hydrogen to carbon monoxide is required. The main elements of an ATR reactor are a burner, a combustion chamber, and a catalyst bed contained within a refractory lined pressure shell. In an ATR reactor, partial combustion of the hydrocarbon feed by sub-stoichiometric amounts of oxygen is followed by steam reforming of the partially combusted feedstock in a fixed bed of steam reforming catalyst. Steam reforming also takes place to some extent in the combustion chamber due to the high temperature. The steam reforming reaction is accompanied by the water gas shift reaction. Typically, the gas is at or close to equilibrium at the outlet of the reactor with respect to steam reforming and water gas shift reactions. The temperature of the exit gas is typically in the range between 850° C. and 1100° C. More details of ATR and a full description can be found in the art, such as "Studies in Surface Science and Catalysis", Vol. 152, "Synthesis gas production for FT synthesis"; Chapter 4, p. 258-352, 2004.

ATR uses oxygen and steam, and optionally also carbon dioxide, in a reaction with a hydrocarbon feed stream to form synthesis gas. The ratio of hydrogen to carbon monoxide in the exit gas depends upon the selected operation conditions including the amount of steam and carbon dioxide added to the hydrocarbon feed stream and/or the ATR reactor. Increasing the amount of carbon dioxide will decrease the hydrogen to carbon monoxide ratio in the product gas, but will also increase the size of the reactor due to the higher flow.

Synthesis gas may also be produced by processes based on thermal partial oxidation (TPOX). In a TPOX reactor the hydrocarbon feed stream and the oxidant react thermally without catalyst in a refractory lined reactor at high temperature. The temperature of the synthesis gas leaving the TPOX will often be at about 1200-1300° C. or even above. No catalyst is involved. Little or no steam or carbon dioxide is added to the feedstock as this may promote the formation of soot.

The term "synthesis gas" is meant to denote a gas comprising hydrogen, carbon monoxide and possibly also carbon dioxide and small amounts of other gasses, such as argon, nitrogen, etc.

SUMMARY OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

An aspect of the invention provides a process for reforming a hydrocarbon feed stream comprising a hydrocarbon gas and steam, the process comprising the steps of: a) in a synthesis gas generation reactor, optionally comprising a first catalyst, generating a first synthesis gas from the hydrocarbon feed stream; b) providing a heated $CO_2$ rich stream to a post converter comprising a second catalyst; and c) in the post converter carrying out at least steam reforming, methanation and reverse water gas shift reactions of the first synthesis gas and the heated $CO_2$ rich stream to produce a product synthesis gas, wherein the second catalyst is heated electrically by means of an electrical power source.

The process of the invention is a two-step process taking place in two different reactors, where a heated $CO_2$ rich gas is added to the first synthesis gas in between the two reactors or directly into the post converter. The heated $CO_2$ rich gas is added to the first synthesis gas or mixed with the first synthesis gas within the post converter.

This first synthesis gas is thus mixed with heated $CO_2$ rich gas. This mixing allows the H/C ratio and the O/C ratios of the gas within the post converter to differ from the H/C and O/C ratios within the synthesis gas generation reactor and thereby promote the production of carbon monoxide and a product synthesis gas with a low $H_2/CO$-ratio. Within this context, the term "stream with a low $H_2/CO$ ratio" is meant to denote a CO rich gas stream, such as a gas stream with a $H_2/CO$ ratio below 2.5, preferably a gas stream with a $H_2/CO$ ratio below 2.0, more preferably a gas stream with a H$_2$/CO ratio below 1.8, even more preferably a gas stream with a H$_2$/CO ratio below 1.6

The temperature of the catalyst in the post converter should be kept sufficiently high to avoid that carbon is formed on the catalyst. This minimum temperature depends on the operating conditions but typically would be above 750° C. or more preferably above 800° C. The temperature of the second catalyst in the post converter and of the product synthesis gas will be below 1050° C. or more preferably below 1000° C. By heating the second catalyst bed by electrical heating, it is possible to ensure that the temperature of the second catalyst does not drop below the critical temperature for carbon formation to take place.

The term "generating a first synthesis gas" is meant to cover to following reactions:
- reaction of the first hydrocarbon feed stream over the first catalyst in a steam methane reforming reactor,
- the combination of partial combustion of the hydrocarbon feed by sub-stoichiometric amounts of oxygen followed by steam reforming of the partially combusted hydrocarbon feed stream over the first catalyst,
- thermal partial oxidation in a thermal partial oxidation reactor, without the use of a catalyst, and
- catalytic partial oxidation over the first catalyst in a catalytic partial oxidation reactor.

Within this context the term S/C is an abbreviation for the steam-to-carbon ratio. The steam-to-carbon ratio is the ratio of moles of steam to moles of carbon in hydrocarbons in the gas. Thus, S/C is the total number of moles of steam divided by the total number of moles of carbon from the hydrocarbons in the gas. The term O/C is an abbreviation for the atomic oxygen-to-carbon ratio. The oxygen-to-carbon ratio is the ratio of moles of oxygen to moles of carbon in a gas. The term H/C is an abbreviation for the atomic hydrogen-to-carbon ratio. The hydrogen-to-carbon ratio is the ratio of moles hydrogen to moles of carbon in a gas. It should be noted that the term "C" in the ratio S/C thus is different from the "C" in the ratios H/C and O/C, since in S/C "C" is from hydrocarbons only, whilst in O/C and H/C, "C" denotes all the carbon in the gas.

The term "post converter" is meant to denote a reactor downstream a synthesis gas generation reactor, such as a steam methane reformer, where the steam reforming, methanation and reverse water gas shift reactions run towards equilibrium in the post converter. The synthesis gas from the synthesis gas generation reactor is converted into a product synthesis gas in the post converter, the product synthesis gas having a lower H$_2$/CO ratio than the synthesis gas from the synthesis gas generation reactor.

Since the CO$_2$ rich gas is heated prior to introduction thereof into the synthesis gas reactor or the post converter, the combination of the CO$_2$ rich gas and the first synthesis gas is sufficiently hot in order to ensure that carbon formation on the second catalyst can be avoided; thus, a synthesis gas can be produced at more critical conditions than by typical reforming. For example, the heated CO$_2$ rich gas is heated to about 800° C. prior to being added into the first synthesis gas or the post converter.

Within this context the term "a CO$_2$ rich gas" is meant to denote a gas comprising at least 50 dry mole % CO$_2$, such as at least 70 dry mole % CO$_2$, such as at least 90 dry mole % CO$_2$.

Moreover, the term "reforming" is meant to denote a reforming reaction according to one or more of the following reactions:

$$CH_4 + H_2O \leftrightarrow CO + 3H_2 \qquad (i)$$

$$CH_4 + 2H_2O \leftrightarrow CO_2 + 4H_2 \qquad (ii)$$

$$CH_4 + CO_2 \leftrightarrow 2CO + 2H_2 \qquad (iii)$$

Reactions (i) and (ii) are steam methane reforming reactions, whilst reaction (iii) is the dry methane reforming reaction.

For higher hydrocarbons, viz. $C_nH_m$, where n≥2, m≥4, equation (i) is generalized as:

$$C_nH_m + nH_2O \rightarrow nCO + (n+m/2)H_2 \qquad (iv),$$

where n≥2, m≥4

Typically, reforming is accompanied by the water gas shift reaction (v):

$$CO + H_2O \leftrightarrow CO_2 + H_2 \qquad (v)$$

The term "steam methane reforming" is meant to cover the reactions (i) and (ii), whilst the term "methanation" is meant to cover the reverse reaction of reaction (i). Thus, the term "steam methane reforming/methanation reactions" is meant to denote the reactions (i) and (ii) running towards equilibrium. The term "reverse water gas shift" is meant to denote the reverse reaction of reaction (v). In most cases, all of these reactions are at or close to equilibrium at the outlet from the catalyst bed or catalyst zone of the reactor concerned.

The term "hydrocarbon feed stream" is meant to denote a feed stream comprising a hydrocarbon gas with one or more hydrocarbons, and possibly other constituents, such as CO$_2$ and/or steam. The term "hydrocarbon gas" is meant to denote a stream comprising one or more hydrocarbons and possibly other constituents, such as hydrogen, carbon monoxide, carbon dioxide, nitrogen, argon and mixtures thereof. Examples of "a hydrocarbon gas" may be natural gas, town gas, or a mixture of methane and higher hydrocarbons. Typically, the hydrocarbon feed stream is a hydrocarbon gas stream comprising minor amounts of hydrogen, carbon monoxide, carbon dioxide, nitrogen, or argon, or combinations thereof, in addition to steam and possibly carbon dioxide added to the hydrocarbon gas.

Typically, the hydrocarbon gas will have undergone desulfurization to remove sulfur therein and thereby avoid deactivation of the catalysts in the process.

Optionally, the hydrocarbon gas will together with steam also have undergone adiabatic prereforming according to reaction (iv) in a temperature range of ca. 350-550° C. to convert higher hydrocarbons as an initial step in the process normally taking place downstream the desulfurization step. This removes the risk of carbon formation from higher hydrocarbons on catalyst in the subsequent process steps.

In an embodiment, the second catalyst is heated by resistance heating and/or inductive heating. This provides for a compact catalyst arranged to provide heat for the reactions, and thus for a compact post converter.

In an embodiment, the synthesis gas generation reactor is a steam methane reforming reactor comprising a heat source arranged to heat the first catalyst within at least one reformer tube to a temperature sufficient to ensure that the first synthesis gas exiting the steam methane reforming reactor has a temperature of between about 650° C. and about 950° C.

In an embodiment, the steam methane reforming reactor is heated by resistance heating and/or inductive heating. This provides for a compact steam methane reforming reactor, which may be heated very quickly. The quick heating of the methane reforming reactor also makes it suitable as a small unit that may be turned on/off easily. The catalyst within the steam methane reforming reactor may be a monolith and/or be made of ferromagnetic material coated with catalytically active material.

In an embodiment, the synthesis gas generation reactor is an autothermal reforming (ATR) reactor with operating conditions adjusted to ensure that the first synthesis gas exiting the autothermal reforming reactor has a temperature of between 850° C. and 1100° C.

In another embodiment, the synthesis gas generation reactor is a thermal oxidation (TPOX) reactor with operating conditions adjusted to ensure that the first synthesis gas exiting the thermal oxidation reactor has a temperature of between 1100° C. and 1500° C.

In an embodiment, in step b), the amount and/or composition of the heated $CO_2$ rich stream added is adjusted to ensure that the $H_2/CO$ ratio of the product synthesis gas is below 2.5. When the heated $CO_2$ rich stream has a very high content of $CO_2$, such as e.g. 80 dry mole % $CO_2$ or more, the amount of the heated $CO_2$ rich stream sufficient to ensure that the $H_2/CO$ ratio of the product gas stream is below 2.5 is less than in a case where the heated $CO_2$ rich stream has a lower concentration of $CO_2$, such as e.g. 50 dry mole % $CO_2$. Advantageously, the amount and/or composition of the heated $CO_2$ rich stream is adjusted to ensure that the $H_2/CO$ ratio of the product gas stream is below 1.5 or even below 1.

In an embodiment, the ratio between molar flow of $CO_2$ in the heated $CO_2$ rich stream and the molar flow of hydrocarbons in the hydrocarbon feed stream is larger than 0.5. The ratio between the molar flow of $CO_2$ in the heated $CO_2$ rich stream and the molar flow of hydrocarbons in the hydrocarbon feed stream may e.g. be about 1:1, about 2:1, about 3:1, about 4:1, about 5:1, about 6:1 or even higher.

In an embodiment, the hydrocarbon feed stream may further comprise one or more of the following: hydrogen, carbon monoxide, carbon dioxide, nitrogen, argon, higher hydrocarbons or combinations thereof.

In an embodiment, the steam-to-carbon ratio of the hydrocarbon feed stream is between about 0.4 and about 2.0.

In an embodiment, the heated $CO_2$ rich stream comprises: least 50 dry mole % $CO_2$, preferably at least 70 dry mole % $CO_2$, and most preferably at least 90 dry mole % $CO_2$.

The heated $CO_2$ rich stream may be substantially pure $CO_2$.

In an embodiment, the heated $CO_2$ rich stream further comprises one or more of the following: steam, hydrogen, methane, carbon monoxide, hydrogen sulfide, sulfur dioxide, nitrogen, argon or combinations thereof. Such a heated $CO_2$ rich stream could for example be a recycle gas stream from a reducing gas process.

In an embodiment, the heated $CO_2$ rich stream is heated to a temperature of between about 350° C. and about 950° C. prior to addition thereof to the first synthesis gas or to the post converter. Hereby, since the heated $CO_2$ rich stream is heated, the combination of the heated $CO_2$ rich stream and the first synthesis gas within the post converter is sufficiently hot to avoid carbon formation on the second catalyst. Thus, a synthesis gas can be produced at more critical conditions than by typical reforming. Preferably, the heated $CO_2$ rich stream is heated to about 650° C. prior to being added into the reformed gas stream.

In an embodiment, the heated $CO_2$ rich gas has a temperature of between about 500° C. and 1100° C. prior to combination with the at least part of the first synthesis gas and/or prior to being inlet into the post converter. Preferably, the temperature of the heated $CO_2$ rich gas is above 600° C., and more preferably the temperature of the heated $CO_2$ rich gas is about 700° C. or above, in order to avoid too low temperatures in the post converter and consequently coking of the second catalyst.

Another aspect of invention relates to a system for reforming of a hydrocarbon feed stream comprising a hydrocarbon gas and steam, the system comprising:
  a synthesis gas generation reactor, optionally comprising a first catalyst, arranged to generate a first synthesis gas from said hydrocarbon feed stream,
  a post converter housing a second catalyst active for steam reforming, methanation and reverse water gas shift reactions,
  a conduit for conducting the first synthesis gas to said post converter,
  means for adding a heated $CO_2$ rich stream to the first synthesis gas upstream of the post converter and/or for adding a heated $CO_2$ rich stream directly into said post converter,
wherein said system comprises an electrical power source arranged for heating said second catalyst electrically.

Embodiments of the system relates to similar details as described in relation to embodiments of the process. These will not be described in detail again.

In an embodiment, the first catalyst is a reforming catalyst, e.g. a nickel based catalyst. In an embodiment, the second catalyst is a catalyst active for steam methane reforming, methanation and reverse water gas shift reactions. The first and second catalysts can thus be identical or different. Examples of reforming catalysts could be $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, a noble metal on an $Al_2O_3$ carrier, but other catalysts suitable for reforming are also conceivable. Steam reforming catalyst is also denoted steam methane reforming catalyst or methane reforming catalyst.

In an embodiment, the second catalyst comprises a macroscopic support, wherein the macroscopic support comprises an electrically conductive material and the macroscopic support supports a ceramic coating, where the macroscopic support and the ceramic coating have been sintered in an oxidizing atmosphere in order to form chemical bonds between the oxide coating and the macroscopic support, and wherein the ceramic coating supports catalytically active particles. The macroscopic support may comprise iron, chromium, aluminum or an alloy thereof. Such a second catalyst is well suited for resistance heating.

The ceramic coating may be an oxide comprising aluminum, zirconium, magnesium and/or cerium, and/or calcium.

The second catalyst may comprise a macroscopic support, wherein the macroscopic support comprises a ferromagnetic material and the macroscopic support supports a ceramic coating, and wherein the ceramic coating supports catalytically active particles. Such a second catalyst is well suited for inductive heating.

The catalytic activity for reforming reaction in the post converter can be obtained either by conventional fixed beds of (pellet) catalysts, by catalysed hardware, or by structured catalysts. In case of catalysed hardware, catalytic material is added directly to a metal surface, viz. the surface of the support. The catalytic coating of a metal surface (wash coating) is a well-known process (a description is given in e.g. Cybulski, A., and Moulijn, J. A., Structured catalysts and reactors, Marcel Dekker, Inc, New York, 1998, Chapter 3, and references herein).

The appropriate material of the macroscopic support, preferable a ferritic steel containing Cr and/or Al, is heated to a temperature preferably above 800° C. in order to form a layer of Cr and/or Al oxide. This layer facilitates a good adhesion of the ceramic to the steel. A thin layer of a slurry containing the ceramic precursor is applied on the surface by means of e.g. spraying, painting or dipping. After applying the coat, the slurry is dried and calcined at a temperature usually in the region 350-1000° C. Finally, the ceramic layer is impregnated with the catalytic active material, e.g. catalytically active particles. Alternatively, the catalytic active material is applied simultaneously with the ceramic precursor.

Catalysed hardware either be catalyst attached directly to a channel wall in which the process gas flows or catalyst attached to a metallic macroscopic support in the form of a structured element. The structured element serves to provide support to the catalyst.

Structured elements are devices comprising a plurality of layers with flow channels present between the adjoining layers. The layers are shaped in such a way that placing the adjoining layers together results in an element in which the flow channels can, for instance, cross each other or can form straight channels. Structured elements are further described in for instance U.S. Pat. Nos. 5,536,699, 4,985,230, EP396, 650, EP433,223 and EP208,929.

The structured elements are e.g. straight-channelled elements. For example, straight channel monoliths are suitable for use in the process of the invention when resistance heating is employed in the post converter. Other catalysed structured elements can also be applied, such as high surface structured elements. Examples of structured catalysts includes catalysed monoliths The amount of catalyst can be tailored to the required catalytic activity for the methane reforming reaction, the methanation reaction and the reverse water gas shift reactions at the given operating conditions. In this manner, the pressure drop is lower and the amount of catalyst is not more than needed which is especially an advantage if the costly noble metals are used.

BRIEF DESCRIPTION OF THE DRAWING

An embodiments of the present invention is explained, by way of example, and with reference to the accompanying drawing. It is to be noted that the appended drawing illustrates only an examples of an embodiment of this invention and is therefore not to be considered limiting of its scope, for the invention may admit to other equally effective embodiments.

FIG. 1 is a schematic drawing illustrating a system according to the invention.

DETAILED DESCRIPTION

The following is a detailed description of embodiments of the invention depicted in the accompanying drawing. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 is a schematic drawing illustrating a system 100 for reforming of a hydrocarbon feed stream comprising a hydrocarbon gas and steam, according to the invention. The system 100 comprises a synthesis gas generation reactor 10, in this example a steam methane reformer (SMR). The SMR reactor 10 contains one or more heat sources and may be a conventional fired steam methane reformer, such as a side fired, top fired, bottom fired or terrace fired reformer. The SMR reactor 10 has a plurality of reformer tubes (only one tube is shown in FIG. 1) housing reforming catalyst. The SMR reactor 10 has an inlet for feeding a hydrocarbon feed stream 3, e.g. a hydrocarbon gas stream 1 combined with steam 2, into the reformer tubes and an outlet for outletting a first synthesis gas 4 from the SMR reactor 10. The heat source and the operating conditions are arranged to heat the catalyst within the at least one reformer tube to a temperature sufficient to ensure that the first synthesis gas exiting the synthesis gas generation reactor has a temperature of between about 650° C. and about 950° C.

The system 100 moreover comprises a post converter 20 housing a second catalyst 25. The second catalyst 25 is active in catalyzing the steam methane reforming, methanation and reverse water gas shift reactions.

The system moreover comprises a heater (not shown), for example a fired heater, for heating a $CO_2$ rich stream to a heated $CO_2$ rich stream 5. A conduit connects the outlet from the SMR reactor 10 to the inlet to the post converter 20. The heated $CO_2$ rich stream 5 is added to the first synthesis gas 4 upstream of the post converter 20, thereby producing a mixed gas stream 6. This mixed gas stream 6 is inlet into the post converter 20, and the product synthesis gas 7 exits the reactor 20 as a product gas. The product synthesis gas 7 may undergo further processing downstream of the post converter 20.

The post converter 20 serves to equilibrate the mixed gas stream 6 and thereby to increase the CO production and to decrease the $H_2/CO$ ratio of the resulting product synthesis gas 7 compared to the first synthesis gas 4.

A power source 30 is provided and electrical lines 31 are provided between the power source 30 and the post converter 20 and/or between the power source and the second catalyst 25 within the post converter 20. In the case, where the second catalyst 25 is arranged to be heated by resistance heating, the electrical lines 31 connect the power source and the second catalyst 25. In the case, where the second catalyst 25 is arranged to be heated by inductive heating, the power source is arranged to supply alternating current to an induction coil surrounding the second catalyst 25 or at least part of the post converter in order to generate an alternating magnetic field within at least a part of the second catalyst 25.

In the embodiment shown in FIG. 1, the heated $CO_2$ rich stream 5 is added to the first synthesis gas stream to a mixed gas stream 6 prior to being let into the post converter 20. However, alternatively, the heated $CO_2$ rich stream 5 and the first synthesis gas 4 may be added separately into the post converter 20 for mixing therein upstream the bed of second catalyst 25.

In the embodiment shown in FIG. 1, the SMR reactor 10 is a steam methane reforming reactor. Alternatively, the synthesis gas generation reactor 10 could be an autothermal reforming reactor.

EXAMPLE

An example calculation of the process is given in Table 1 below. A hydrocarbon feed stream comprising a hydrocarbon gas, $CO_2$ and steam and having a S/C ratio of 1.0 is fed to the SMR reactor 10 of the invention as shown in FIG. 1. This hydrocarbon feed stream is heated to 650° C. prior to being let into the SMR reactor 10, and within the SMR reactor 10 the gas is reformed and exits the SMR reactor 10 as the first synthesis gas having a temperature of 950° C.

The equilibrium temperature of the methane decomposition reaction to graphitic carbon for the given composition of the first synthesis gas is 994° C. and the equilibrium temperature of the Boudouard reaction to graphitic carbon of the first synthesis gas is 927° C. Thus, the temperature of the first synthesis gas is below the equilibrium temperature of the methane decomposition reaction and above the equilibrium temperature of the Boudouard reaction, and consequently the first synthesis gas (or the gas within the SMR) does not have affinity for carbon formation.

In this context, the methane decomposition temperature (T(MDC)) is calculated as the temperature where the equilibrium constant of the methane decomposition into graphite ($CH_4 \leftrightarrow C+2H_2$) equals the reaction quotient of the gas. Formation of graphitic carbon can take place when the temperature is higher than this temperature. The reaction quotient QC is defined as the ratio of the square of the partial pressure of hydrogen to the partial pressure of methane, i.e. $QC=P^2_{H2}/P_{CH4}$.

The Boudouard equilibrium temperature (T(BOU)) is calculated in a similar way, but from the Boudouard reaction ($2CO \leftrightarrow C+CO_2$) and in this case formation of graphitic carbon can take place when the temperature is lower than this temperature.

A $CO_2$ gas is heated to 650° C. to form a heated $CO_2$ rich stream in the form of a heated $CO_2$ gas and the combined gas (the first synthesis gas and the heated $CO_2$ gas) enters the post converter 20 at a temperature of 791° C.

Within the post converter 20 the combined stream is equilibrated, viz. it undergoes reverse water gas shift, methanation and reforming reactions, thereby forming the product synthesis gas. The exit temperature of the product synthesis gas exiting the post converter is controlled to 950° C. by the electrical heating, which is well below the methane decomposition equilibrium temperature for the gas of 1205° C. and above the Boudouard temperature for the gas of 845° C. Consequently, the product synthesis gas (or the gas within the post converter) does not have potential for carbon formation.

TABLE 1

| | SMR reactor 10 | $CO_2$ preheater | Post converter 20 |
|---|---|---|---|
| Inlet T [° C.] | 650 | | 791 |
| Outlet T [° C.] | 950 | 650 | 950 |
| Inlet P [kg/cm²g] | 26 | | 25.5 |
| Outlet P [kg/cm²g] | 25.5 | 26 | 25 |
| Outlet T(MDC) [° C.] | 994 | | 1205 |
| Outlet T(BOU) [° C.] | 927 | | 845 |
| Inlet: | | | |
| $CO_2$ [Nm³/h] | 0 | 2600 | 2654 |
| $CH_4$ [Nm³/h] | 1000 | 0 | 322 |
| $H_2$ [Nm³/h] | 0 | 0 | 2089 |
| CO [Nm³/h] | 0 | 0 | 625 |
| $H_2O$ [Nm³/h] | 1000 | 0 | 268 |
| Outlet: | | | |
| $CO_2$ [Nm³/h] | 54 | 2600 | 1286 |
| $CH_4$ [Nm³/h] | 322 | 0 | 28 |
| $H_2$ [Nm³/h] | 2089 | 0 | 1602 |
| CO [Nm³/h] | 625 | 0 | 2287 |
| $H_2O$ [Nm³/h] | 268 | 0 | 1342 |
| Total flow [Nm³/h] | 3358 | 2600 | 6545 |

Thus, when the system and process of the invention are used, it is possible to provide a synthesis gas stream having a relative high amount of CO. In the example of Table 1, the $H_2$/CO ratio is 0.7.

Production of a similar synthesis gas in a standalone steam methane reformer would need large amounts of $H_2O$ and $CO_2$ as co-feeds to achieve the same synthesis gas, as illustrated by Table 2. In the comparative example specified in Table 2 the same product synthesis gas as the product synthesis gas of Table 1 is achieved in a steam methane reformer. However, a very large feed of $H_2O$ and $CO_2$ has to be added to the steam methane reformer to avoid carbon formation which results in a large SMR. In the example of Table 2 this is illustrated by an outlet synthesis gas flow of the SMR of 10308 Nm³/h, compared to only 6545 Nm³/h out of the system of Table 1 for production of practically the same amount of $H_2$ and CO. Consequently, the concept of the invention enables a much smaller steam methane reformer design. This indicates that the invention is also useful for revamps.

TABLE 2

| | Standalone SMR |
|---|---|
| Inlet T [° C.] | 400 |
| Outlet T [° C.] | 950 |
| Inlet P [kg/cm²g] | 26 |
| Outlet P [kg/cm²g] | 25.5 |
| Outlet MDC T [° C.] | — |
| Inlet: | |
| $CO_2$ [Nm³/h] | 4477 |
| $CH_4$ [Nm³/h] | 973 |
| $H_2$ [Nm³/h] | 0 |
| CO [Nm³/h] | 0 |
| $H_2O$ [Nm³/h] | 2920 |
| Outlet: | |
| $CO_2$ [Nm³/h] | 3159 |
| $CH_4$ [Nm³/h] | 5 |
| $H_2$ [Nm³/h] | 1588 |
| CO [Nm³/h] | 2287 |
| $H_2O$ [Nm³/h] | 3269 |
| Total flow [Nm³/h] | 10308 |

The invention claimed is:

1. A process for reforming a hydrocarbon feed stream comprising a hydrocarbon gas and steam, said process comprising the steps of:
   a) in a synthesis gas generation reactor, optionally comprising a first catalyst, generating a first synthesis gas from the hydrocarbon feed stream;
   b) providing a heated $CO_2$ rich stream to a post converter comprising a second catalyst active for steam reforming, methanation and reverse water gas shift reactions; and
   c) in said post converter carrying out steam reforming, methanation and reverse water gas shift reactions of said first synthesis gas and said heated $CO_2$ rich stream to produce a product synthesis gas, wherein said second catalyst is heated electrically by means of an electrical power source, wherein the steam reforming, methanation and reverse water gas shift reactions run towards equilibrium in the post-converter.

2. The process according to claim 1, wherein said second catalyst is heated by resistance heating and/or inductive heating.

3. The process according to claim 1, wherein the synthesis gas generation reactor is a steam methane reforming reactor comprising a heat source arranged to heat said first catalyst within at least one reformer tube to a temperature sufficient to ensure that the first synthesis gas exiting the steam methane reforming reactor has a temperature of between about 650° C. and about 950° C.

4. The process according to claim 3, wherein the steam methane reforming reactor is heated by resistance heating and/or inductive heating.

5. The process according to claim 1, wherein the synthesis gas generation reactor is an autothermal reforming reactor with operating conditions adjusted to ensure that the first synthesis gas exiting the autothermal reforming reactor has a temperature of between 900° C. and 1100° C.

6. The process according to claim 1, wherein in step b) the amount and/or composition of said heated $CO_2$ rich stream added is adjusted to ensure that the $H_2/CO$ ratio of said product synthesis gas is below 2.5.

7. The process according to claim 1, wherein the mole ratio between $CO_2$ in the heated $CO_2$ rich stream and hydrocarbons in the hydrocarbon feed stream is larger than 0.5.

8. The process according to claim 7, wherein the hydrocarbon feed stream further comprises one or more of the following: hydrogen, carbon monoxide, carbon dioxide, nitrogen, argon, higher hydrocarbons or combinations thereof.

9. The process according to claim 1, wherein the steam-to-carbon ratio of the hydrocarbon feed stream is between about 0.4 and about 2.0.

10. The process according to claim 1, wherein the heated $CO_2$ rich stream comprises: least 50 dry mole % $CO_2$, preferably at least 70 dry mole % $CO_2$, and most preferably at least 90 dry mole % $CO_2$.

11. The process according to claim 1, wherein the heated $CO_2$ rich stream further comprises one or more of the following: steam, hydrogen, methane, carbon monoxide, hydrogen sulfide, sulfur dioxide, nitrogen, argon or combinations thereof.

12. The process according to claim 1, wherein the heated $CO_2$ rich stream is heated to a temperature of between about 350° C. and about 950° C. prior to addition thereof to the first synthesis gas.

13. A system for reforming of a hydrocarbon feed stream comprising a hydrocarbon gas and steam, said system comprising:
a synthesis gas generation reactor, optionally comprising a first catalyst, and arranged to generate a first synthesis gas from said hydrocarbon feed stream,
a post converter housing a second catalyst active for steam reforming, methanation and reverse water gas shift reactions, wherein the system is configured for the steam reforming, methanation and reverse water gas shift reactions to run towards equilibrium in the post-converter,
a conduit for conducting the first synthesis gas to said post converter,
means for adding a heated $CO_2$ rich stream to the first synthesis gas upstream of said post converter and/or for adding a heated $CO_2$ rich stream directly into said post converter,
wherein said system comprises an electrical power source arranged for heating said second catalyst electrically.

14. The system according to claim 13, wherein the synthesis gas generation reactor is a steam methane reforming reactor comprising a heat source arranged to heat said first catalyst within at least one reformer tube to a temperature sufficient to ensure that the first synthesis gas exiting the steam methane reforming reactor has a temperature of between about 650° C. and about 950° C.

15. The system according to claim 13, wherein said synthesis gas generation reactor is an autothermal reforming reactor with operating conditions adjusted to ensure that the first synthesis gas exiting the autothermal reforming reactor has a temperature of between 900° C. and 1100° C.

16. The system according to claim 13, wherein said post converter is arranged to be heated by resistance heating and/or inductive heating.

17. The system according to claim 13, wherein said first catalyst is a reforming catalyst.

18. The system according to claim 13, wherein said second catalyst is a catalyst active for steam methane reforming, methanation and reverse water gas shift reactions.

19. The process according to claim 1, wherein the steam reforming, methanation and reverse water gas shift reactions all reach equilibrium in the post-converter.

20. The system according to claim 13, wherein the system is configured for the steam reforming, methanation and reverse water gas shift reactions to all reach equilibrium in the post-converter.

* * * * *